| (12) | United States Patent | (10) Patent No.: | US 6,729,579 B1 |
|---|---|---|---|
| | Becker | (45) Date of Patent: | May 4, 2004 |

(54) FLIGHT CONTROL DEVICE FOR IMPROVING THE LONGITUDINAL STABILITY OF AN AUTOMATICALLY CONTROLLED AIRPLANE AND METHOD OF OPERATING SAME

(75) Inventor: Juergen Becker, Munich (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 09/366,533

(22) Filed: Aug. 4, 1999

(30) Foreign Application Priority Data

Aug. 4, 1998 (DE) .......................................... 198 35 191

(51) Int. Cl.$^7$ ............................................... B64C 13/00
(52) U.S. Cl. .................. 244/76 R; 244/90 R; 244/45 A
(58) Field of Search ............................ 244/45 A, 75 R, 244/213, 200, 211, 212, 230, 90 R, 76 R, 178, 179, 180, 181; 701/4

(56) References Cited

U.S. PATENT DOCUMENTS

| 2,681,776 | A | * | 6/1954 | Howard |
| 2,747,816 | A | * | 5/1956 | Howard |
| 3,188,022 | A | * | 6/1965 | Ornberg |
| 3,734,432 | A | | 5/1973 | Low .......................... 244/77 G |
| 3,761,041 | A | * | 9/1973 | Putman |
| 4,146,200 | A | * | 3/1979 | Borzachillo |
| 4,562,546 | A | | 12/1985 | Wykes et al. ................ 364/434 |
| 4,569,493 | A | * | 2/1986 | Burnhans |
| 4,598,888 | A | * | 7/1986 | Beteille |
| 4,641,800 | A | * | 2/1987 | Rutan |
| 4,706,902 | A | | 11/1987 | Destuynder et al. ...... 244/76 C |
| 4,796,192 | A | | 1/1989 | Lewis |
| RE33,385 | E | * | 10/1990 | Mazzoni |
| 5,072,893 | A | | 12/1991 | Chakravarty et al. |
| 5,135,186 | A | | 8/1992 | Ako .......................... 244/75 A |
| 5,186,416 | A | * | 2/1993 | Fabre et al. |
| 5,375,793 | A | * | 12/1994 | Rivron et al. |
| 5,542,625 | A | * | 8/1996 | Burhans et al. |
| RE35,387 | E | * | 12/1996 | Strom |
| 5,667,166 | A | | 9/1997 | Tran et al. |
| 5,992,792 | A | * | 11/1999 | Arnason |

* cited by examiner

Primary Examiner—Tien Dinh
(74) Attorney, Agent, or Firm—Crowell & Moring LLP

(57) ABSTRACT

Flight control system for the longitudinal control of an automatically controlled airplane having adjusting surfaces provided for the longitudinal control which, viewed from the longitudinal axis of the airplane, are on the outside and on the inside. For the stabilization and control of the airplane in its longitudinal axis, the inner adjusting surfaces are controlled to experience an amplification which is substantially larger than that of the outer adjusting surfaces.

17 Claims, 1 Drawing Sheet

FLIGHT CONTROL DEVICE FOR IMPROVING THE LONGITUDINAL STABILITY OF AN AUTOMATICALLY CONTROLLED AIRPLANE AND METHOD OF OPERATING SAME

BACKGROUND AND SUMMARY OF THE INVENTION

This application claims the priority of German application 198 36 191.7, filed in Germany on Aug. 4, 1998, the disclosure of which is expressly incorporated by reference herein.

The invention relates to a flight control device for improving the longitudinal stability of an automatically controlled airplane. Especially preferred embodiments of the invention relate to combat planes in a delta wing configuration which are artificially stabilized by means of an automatic control system.

For the longitudinal control of automatically controlled airplanes, the control flaps or adjusting surfaces provided for this purpose, on the one hand, are used for controlling the airplane and, on the other hand, are used for stabilizing the airplane in flying ranges in which the airplane is at or beyond the stability limit. In known state of the art airplanes, the feedback signals of the automatic airplane control system have been switched with essentially the same amplification to the actuators of all control edge flaps and particularly to the actuators for trailing edge flaps responsible for the longitudinal control.

For example, because of changed load conditions, such as outside loads, or because of a changed demand on the maneuverability of the airplane, control concepts of future airplanes will be required to automatically control airplanes with a greater rearward gravity center position and thus with a lower stability. In the case of airplanes which were unstable from the beginning or become unstable only because of such shifts of the center of gravity, it will then be required to stabilize the occurring instability by means of the adjusting surfaces. This results in higher adjusting speeds and larger deflections of the adjusting surface, which, however, excites the airplane structure more and, as a result, higher structural couplings will occur. This causes an increase of the aeroservoelastic instabilities which are to be avoided.

Since there is also a tendency toward softer wing structures, structure filters must be provided in the autopilot in order to avoid that the wing structure is excited to an unacceptable degree. However, such structure filters impair the efficiency of the autopilot so that these may have the result that the demands on the automatic control of the airplane can be met only in a limited manner.

It is therefore an object of the invention to provide a flight control device for improving the longitudinal stability of an automatically controlled airplane which supplies improved possibilities for meeting the demands on the control and the stabilization of the airplane.

This object is achieved according to certain preferred embodiments of the invention by providing a light control device for the longitudinal control of an automatically controlled airplane having adjusting surfaces which, viewed from the longitudinal axis of the airplane, are on the outside and on the inside and are provided for the longitudinal control, wherein the inner adjusting surfaces experience an amplification which is by one half or more larger than that of the outer adjusting surfaces for the stabilization and control of the airplane in its longitudinal axis.

This object is also achieved according to certain preferred embodiments of the invention by providing a flight control device for the longitudinal control of an automatically controlled airplane having adjusting surfaces which, viewed from the longitudinal axis of the airplane, are on the outside and on the inside and are provided for the longitudinal control, wherein for the stabilization and control of the airplane in its longitudinal axis, a maximal velocity is provided for the outer adjusting surfaces which is at least by one fourth lower than that for the inner adjusting surfaces.

In certain preferred embodiments of the invention the above mentioned control features can be combined with the provision of controlled forwardly positioned slats.

The control systems according to the invention have the advantage that only by means of an increase of the superimposing of the amplification in the forward branch of the automatic flight control system and thus of the actuating signals to the actuators of the adjusting surfaces situated close to the fuselage, a higher degree of maneuverability can be achieved and a greater amount of instability can be stabilized. As a result, the phase delay which occurs in the automatic flight control system because of structure filters to be provided in the automatic flight control system, in the area of the control fraction of the wing flap movements, is at least limited or even reduced so that therefore the unfavorable effects of structure filters onto the low-frequency transmission action of the airplane, particularly the control fractions, can be considerably reduced.

Other objects, advantages and novel features of the present invention will become apparent from the following detailed description of the invention when considered in conjunction with the accompanying drawings.

Figure 1:
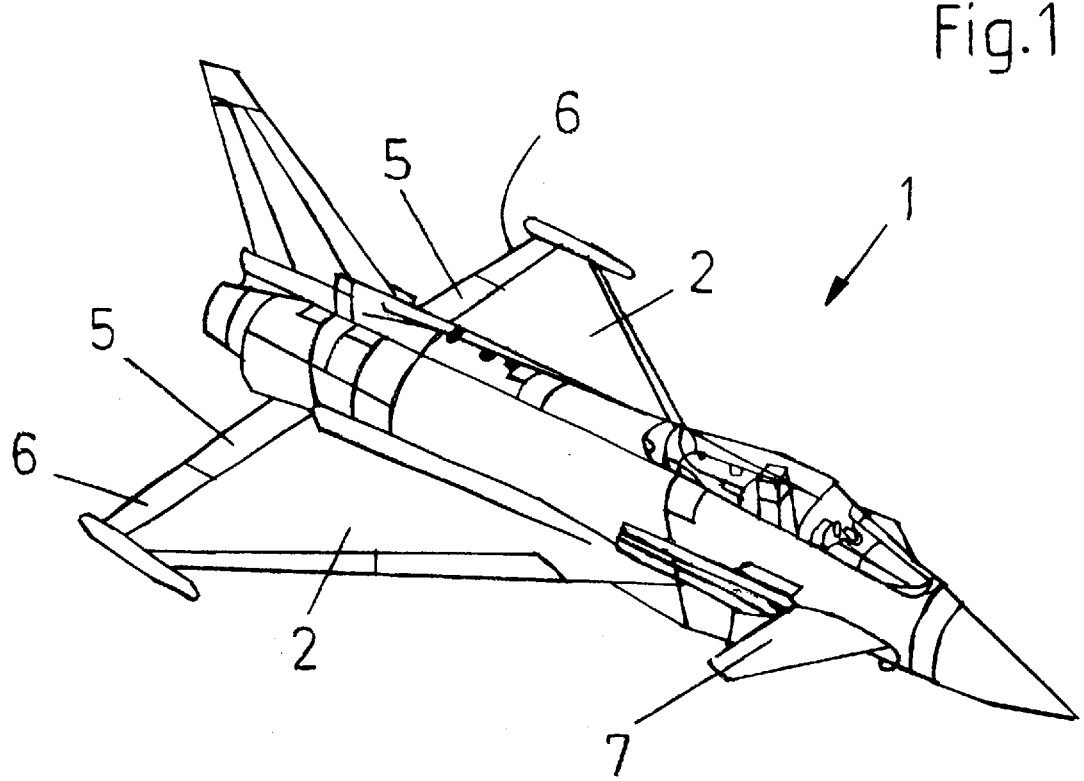
FIG. 1 is a schematic representation of an adjusting surface configuration of a modern combat airplane, constructed according to preferred embodiments of the present application.

The airplane illustrated in FIG. 1 has delta-type wings 2. On each delta-type wing 2, two adjusting flaps or adjusting surfaces respectively are provided, specifically in each case an inner adjusting surface 5 close to the fuselage and an outer adjusting surface 6 situated farther away from the fuselage of the airplane. The airplane also has slats 7 positioned forwardly of the wings which can be adjusted for the trimming and also for the control.

Figure 2:
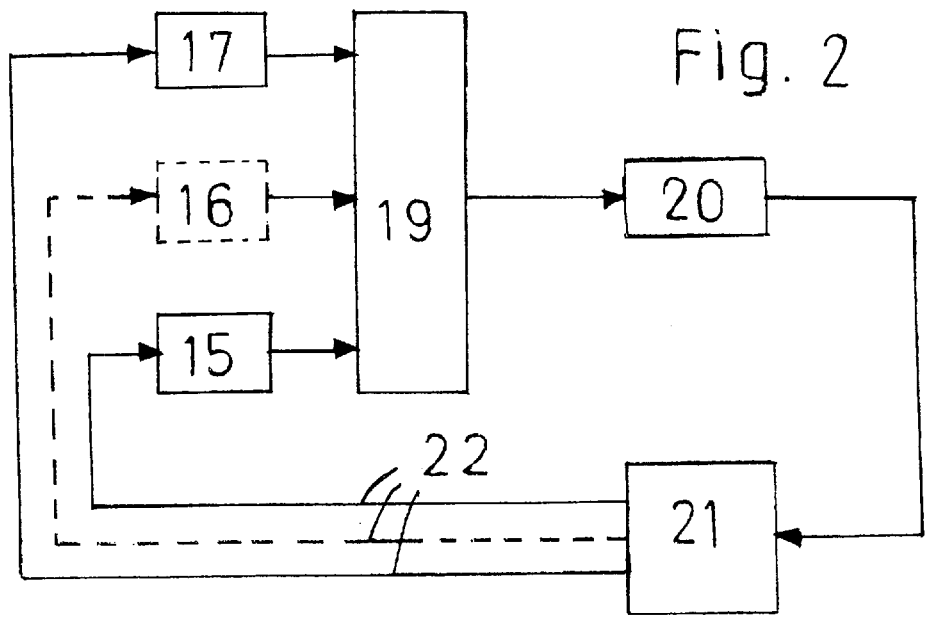
FIG. 2 is a block diagram of the whole automatic flight control system including the feedback signals of an automatically controlled airplane, constructed according to preferred embodiments of the present invention.

In FIG. 2, the transmission block for the transmission action of the interior adjusting surfaces 5 has the reference number 15; the transmission block for the transmission action of the outer adjusting surfaces 6 has the reference number 16; and the transmission block for the transmission action of the slats 7 has the reference number 17, the transmission action of the actuators and of the hydraulic systems in each case being taken into account. Since, according to the invention, the outer adjusting surfaces 6 are not at all or only to a limited degree used for controlling and possibly for stabilizing the airplane, the transmission block 16 is illustrated by broken lines. In the model representation according to FIG. 2, the transmission blocks 15 for the inner adjusting surfaces 5, the transmission block 17 for the slats 7 and, no more than at a significantly lower proportion, the transmission block 16 for the outer adjusting surfaces 6 act upon the transmission block 19 for the airplane and its sensor system relevant to the automatic flight control, particularly the inertial platform. The quantities 20, which are detected by a corresponding sensor system for the automatic flight control, particularly the rotating velocity, the angle of incidence and the vertical acceleration of the airplane, are led into the automatic control module of the flight computer whose transmission block has the reference number 21. The actuating signals 22 generated by these for the actuators of the adjusting surfaces, in the model representation of FIG. 2, arrive on the transmission element 15 for the inner adjusting surfaces 5, the transmission element 16 for the outer adjusting surfaces 6 and the transmission member 17 for the slats 17.

As indicated in the representation of FIG. 2 by means of a broken line, the normal high-frequency feedback onto the outer adjusting surfaces 6 (block 16) is eliminated or at least considerably reduced. Instead, an increase of the superimposing of the actuating signals takes place onto the inner adjusting surfaces 5 by block 15 and optionally additionally also onto the slats 7 by block 17. A suitable low-pass filter, which admits only the low-frequency actuating signals for the control of the outer flaps, has a stabilizing influence because of the outer flaps control. The superimposition essentially onto the inner adjusting surfaces 5 by block 15 takes place with an amplification increase which is implemented in the flight computer 21 and leads to faster and larger adjusting movements of the inner adjusting surfaces 5 addressed by the flight computer 21 because the control effects of the outer adjusting surfaces 6 occurring according to the prior art must essentially be taken over by the inner adjusting surfaces 5.

In this application, the terms adjusting "velocity" or "speed" refers to the angular speed or velocity of the respective adjusting surface members 5, 6, 7.

As an alternative, an adjusting speed limitation can also be provided which becomes operative for the outer adjusting surfaces 6 or control flaps starting at a lower adjusting speed than for the inner adjusting surfaces 5 or for the slats 7, if these are used in the case of the respective airplane. Preferably, the limit speed for the limiting of the outer control flaps 6 amounts to a fourth of the limit speed which is effective for the other control flaps 5.

In the flight computer 21, notch filters or structure filters are provided for filtering out fractions of elastic vibrations in the feed back signals. However, the arrangement of these structure filters results in a partly considerable phase delay in the whole automatic control system of the airplane. These structure filters must be effective for the natural frequencies of the airplane structure. Particularly the attaching of outside loads to the wings of the airplane leads to low natural frequencies typically in the range of between 5 and 14 Hz. If, however, structure filters are provided for these frequency ranges in the automatic flight control, in the case of combat airplanes, in the flight-mechanical frequency range of approximately 1 Hz, a phase delay for the actuating quantities takes place because of the structure filters, whereby the characteristics of the automatic control system deteriorate with respect to the stabilizing and controlling of the airplane. By the increase of the amplification in the forward branch of the automatic control with respect to the inner adjusting surfaces 5 in relationship to the amplification with respect to the outer adjusting surfaces 6, the implementation of structure filters in the low frequency range is required to a significantly lower degree because the filtering of the structure coupling caused by the outer adjusting surfaces or flaps causes a phase shift up to 1 Hz to a high degree. Thus, in comparison to the prior art, a lower phase delay occurs in this frequency band. Possibilities are therefore provided of stabilizing configurations of a higher instability or greater rearward center of gravity position or of improving the stability of today's airplanes.

Preferably, the extent of the amplification for the inner adjusting surfaces 5 is twice as high as the amplification for the outer adjusting surfaces 6, but at least one half larger; that is, the movements of the inner adjusting surfaces 5 for stabilizing and controlling the airplane have an adjusting velocity which is at least by one half larger than that of the outer adjusting surfaces 6 in the same function.

According to certain preferred embodiments, the automatic control system operably controls the velocity of adjustment of the inner adjusting members to be between 150% and 200% of the velocity of adjustment of the outer adjusting members.

This control device is not only advantageous for delta-type wing planes but it can also be provided in the case of all other military and civil airplane configurations whose adjusting surfaces essentially cause the longitudinal control of the airplane. Thus, in the case of civil large capacity air carriers, the adjusting surfaces of the airplane wing can be provided and controlled such that essentially the adjusting surfaces situated on the inside take over the longitudinal control.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Flight control device for the longitudinal control of an automatically controlled airplane having adjusting surfaces which, viewed from the longitudinal axis of the airplane, are on the outside and on the inside and are provided for the longitudinal control, wherein for the stabilization and control of the airplane in its longitudinal axis, a maximal velocity is provided for the outer adjusting surfaces which is at least by one fourth lower than that for the inner adjusting surfaces during flight with adjusting movement of both the inner and outer adjusting surfaces.

2. Flight control device according to claim 1, wherein forward control slats provided on the airplane are additionally controlled by the automatic flight control system for controlling and stabilizing the airplane in the longitudinal axis.

3. An automatically controlled airplane comprising:

a fuselage, a pair of wings at opposite lateral sides of the fuselage, inner adjusting surface members disposed at a trailing edge of the respective wings adjacent the fuselage, outer adjusting surface members disposed at the trailing edge of the respective wings at positions laterally outside the inner adjusting surface member with respect to the fuselage, and an automatic control system operable to provide longitudinal control to the airplane by controlling movements of said inner and outer adjusting surface members with an adjusting velocity of said inner adjusting surface members being substantially greater than the adjusting velocity of said outer adjusting surface members during flight with adjusting movement of both the inner and outer adjusting surface members.

4. An automatically controlled airplane according to claim 3, comprising forward control slats disposed forwardly of the respective wings and adjacent the fuselage, wherein said automatic control system is operable to control said forward control slats.

5. An automatically controlled airplane according to claim 4, wherein said automatic control system is operable to control said forward control slats with an adjusting velocity which is faster than the adjusting velocity of said outer adjusting surface members during flight with adjusting movement of both the inner and outer adjusting surface members.

6. An automatically controlled airplane according to claim 3, wherein said automatic control system operably controls the velocity of adjustment of the inner adjusting members to be between 150% and 200% of the velocity of adjustment of the outer adjusting members during flight with adjusting movement of both the inner and outer adjusting surface members.

7. An automatically controlled airplane according to claim 6, comprising forward control slats disposed forwardly of the respective wings and adjacent the fuselage, wherein said automatic control system is operable to control said forward control slats.

8. An automatically controlled airplane according to claim 7, wherein said automatic control system is operable to control said forward control slats with an adjusting velocity which is faster than the adjusting velocity of said outer adjusting surface members during flight with adjusting movement of both the inner and outer adjusting surface members.

9. An automatically controlled airplane according to claim 3, wherein the automatic control system operably controls the maximal velocity of adjustment of the outer adjusting members to be at least 25% lower than the maximal velocity of adjustment of the inner adjusting surface members during flight with adjusting movement of both the inner and outer adjusting surface members.

10. An automatically controlled airplane according to claim 9, comprising forward control slats disposed forwardly of the respective wings and adjacent the fuselage, wherein said automatic control system is operable to control said forward control slats.

11. An automatically controlled airplane according to claim 10, wherein said automatic control system is operable to control said forward control slats with an adjusting velocity which is faster than the adjusting velocity of said outer adjusting surface members during flight with adjusting movement of both the inner and outer adjusting surface members.

12. An automatically controlled airplane according to claim 3, wherein said automatic control system operably controls the velocity of adjustment of the inner adjusting surface members to be at least 50% larger than the velocity of adjustment of the outer adjusting surface members during flight with adjusting movement of both the inner and outer adjusting surface members.

13. A method of operating an automatically controlled airplane comprising:

a fuselage, a pair of wings at opposite lateral sides of the fuselage, inner adjusting surface members disposed at a trailing edge of the respective wings adjacent the fuselage, outer adjusting surface members disposed at the trailing edge of the respective wings at positions laterally outside the inner adjusting surface members with respect to the fuselage, and an automatic control system operable to provide longitudinal control to the airplane by controlling movements of said inner and outer adjusting surface members, said method comprising controlling an adjusting velocity of said inner adjusting surface members to be substantially greater than the adjusting velocity of said outer adjusting surface members during flight with adjusting movement of both the inner and outer adjusting surface members.

14. A method according to claim 13, wherein said airplane includes forward control slats disposed forwardly of the respective wings and adjacent the fuselage, and wherein said method includes automatic control of said forward control slats.

15. A method according to claim 14, wherein said method includes controlling said forward control slats with an adjusting velocity which is faster than the adjusting velocity of said outer adjusting surface members during flight with adjusting movement of both the inner and outer adjusting surface members.

16. A method according to claim 13, wherein said method includes controlling the velocity of adjustment of the inner adjusting members to be between 150% and 200% of the velocity of adjustment of the outer adjusting members during flight with adjusting movement of both the inner and outer adjusting surface members.

17. A method according to claim 13, wherein said method includes controlling the maximal velocity of adjustment of the outer adjusting members to be at least 25% lower than the maximal velocity of adjustment of the inner adjusting surface members during flight with adjusting movement of both the inner and outer adjusting surface members.

* * * * *